Patented Dec. 17, 1935

2,024,565

UNITED STATES PATENT OFFICE 2,024,565

PROCESS FOR THE PRODUCTION OF LACTIC ACID

Geza Braun, New York, N. Y., assignor to Standard Brands Incorporated, New York, N. Y., a corporation of Delaware No Drawing. Application October 29, 1931, Serial No. 571,857

20 Claims. (Cl. 260—119)

The invention relates to a process for the production of lactic acid, more particularly to a process in which lactic acid is produced by chemical means and includes co-related improvements and discoveries whereby the practice of such a process is enhanced.

The production of lactic acid has heretofore been carried out by taking advantage of biological processes with certain bacteria, whereby various carbohydrates were converted into lactic acid. This process, however, requires considerable time and space, as well as careful supervision of the purity of the bacteria culture used in order to avoid the formation of deleterious by-products. The time and space required materially increase the cost of production. It is an object of this invention to provide a process in which these disadvantages will be obviated.

It is a further object of the invention to produce lactic acid by a simple chemical process that may be readily and economically carried out on a commercial scale.

Another object of the invention is to produce lactic acid from a carbohydrate material through a chemical reaction which gives a good yield of lactic acid in a relatively short period of time.

An additional object of the invention is to produce lactic acid suitable for most industrial purposes from a carbohydrate material by treatment with a strong alkali under such conditions of temperature and pressure as give an efficient production of lactic acid in a minimum period of time.

Other objects of the invention will in part be obvious and will in part appear hereinafter.

The invention accordingly comprises the several steps and the relation and order of one or more of such steps with respect to each of the others thereof, which will be exemplified in the process hereinafter disclosed, and the scope of the application of which will be indicated in the claims.

In the practice of the invention, lactic acid may be produced by reacting a carbohydrate material with a strong alkali at a temperature of at least 200° C. and at a pressure of at least 20 atmospheres. The carbohydrate material is converted into di-lactic acid by chemical reaction in a period which may vary from 1.5 to 2.5 hours and a lactic acid in excellent yield and of a purity sufficient for many industrial purposes is produced. The strong alkali used may be a solution, more or less concentrated, of one or more of the hydroxides of sodium, potassium, calcium, barium or strontium. It will be understood that the term "strong alkali" as here and hereinafter used in the specification and claims is intended to include these various hydroxides when used alone or in any desired combination.

The carbohydrate material may be either the various compounds as glucose, fructose, cane sugar, lactose, invert sugar etc. or different raw materials carrying a percentage of one or more of the carbohydrates. Thus utilization may be made of the juices from the beet or cane, or such by-products of the sugar industry as molasses, and refinery syrups which contain considerable percentages of cane sugar, and/or invert sugar. The relative amounts of the carbohydrate material and the strong alkali used should be such as are stochiometrically required to effect the conversion. Accordingly, for one molecule of glucose there may be used one molecule of calcium hydroxide, or for one molecule of glucose there may be used two molecules of sodium hydroxide, or for one molecule of cane sugar there may be used two molecules of calcium hydroxide etc. The preferred proportions being those which will avoid either an excess of alkali or an excess of unused sugar.

As an illustrative embodiment of a manner in which the invention may be practiced, the following example is presented:

1 part of cane sugar, or of a raw material containing a corresponding amount of cane sugar, is dissolved in 1.5 parts of hot water. To the sugar solution, which is of about 40 per cent sugar strength, there is added about 0.5 part of technical (88 per cent) calcium hydroxide. The mixture of carbohydrate and strong alkali is then heated in a suitable pressure vessel, as an autoclave, at a temperature of from about 210° to 220° C. at a pressure of from 25 to 30 atmospheres with continuous stirring for a period of 1.5 to 2.5 hours. The end of the reaction is indicated by complete conversion of the carbohydrate into organic acids and the substantial neutrality of the mixture. The resulting product contains crude calcium lactate together with calcium salts of other organic hydroxy acids and a small amount of calcium formate. This product is separated from the insoluble matter, as by filtration, and the lactic acid contained therein may then be recovered by some one of the methods hereinafter given, depending upon the degree of purity desired and the use that is to be made of the lactic acid.

The methods that may be used for recovery of the lactic acid are the following:

(a) The liquor containing calcium lactate and having been freed from insoluble matter by filtration, may be allowed to stand at room temperature, or at a somewhat lower temperature, for example 5° to 10° C., in order to permit a slow crystallization of the calcium lactate. There may thus be obtained about 45 per cent of the theoretically possible yield of calcium lactate. The crystallization may be greatly accelerated by slowly stirring the mass and calcium lactate may then be separated, as by means of a hydraulic press or a centrifuge. If a product of greater purity is desired, the calcium lactate so obtained may be recrystallized from a small amount of water. Further, the calcium lactate obtained in crystalline form may be converted into pure lactic acid by treatment with sulphuric acid and removal of precipitated calcium sulphate.

The mother liquor obtained after the crystallization and separation of the calcium lactate may then be treated for conversion into lactic acid by the addition thereto of the required amount of sulphuric acid which may be of about 50 per cent strength. Calcium sulphate precipitates out and may be removed by filtration, whereupon the filtrate, which is a crude lactic acid, is suitable for utilization for many industrial operations. As previously pointed out, there may be a small amount of formic acid present. In the event that such small amount may deleteriously affect the procedure in which the lactic acid is to be used, the formic acid may readily be removed by steam distillation.

(b) The reaction product, after removal of the insoluble material, may be converted into lactic acid by adding thereto the proper amount of sulphuric acid of about 50 per cent strength to convert the calcium lactate content into lactic acid and calcium sulphate. The calcium sulphate may be removed by filtration, whereupon the crude acid may be directly used. The acid so obtained is usually of about 25 to 28 per cent strength and the lactic acid content corresponds to about 72 to 75 per cent by weight based on the sugar supplied. In this case also the formic acid may be removed by steam distillation.

(c) Chemically pure lactic acid may be obtained from the reaction product, after removal of the insoluble matter therefrom by filtration, by converting the calcium lactate into zinc lactate. This result may be accomplished by adding to the calcium lactate containing liquor an amount of zinc sulphate necessary to convert the calcium lactate into zinc lactate and calcium sulphate. Preferably this addition is made to the reaction liquor while it is still hot and with the zinc sulphate in a hot concentrated aqueous solution. The calcium sulphate may be removed by filtration while hot and as quickly as possible, and the zinc lactate allowed to crystallize from the filtrate by cooling. There is thus obtained about 50 per cent of the theoretically possible yield of zinc lactate which may be further purified by recrystallization, if desired. The mother liquor, after removal of the crystalline zinc lactate, may be worked up into lactic acid by precipitating the zinc with hydrogen sulphide, or with barium sulphide followed by an after treatment with sulphuric acid to remove the barium. If desired, the zinc may be recovered, in a manner which will be understood by those skilled in the art, and again used for the recovery of lactic acid.

It will be understood that the invention is not limited to the specific materials, amounts thereof and conditions set forth in the foregoing example. The carbohydrate materials may be those hereinbefore mentioned or a raw material containing the same. The strong alkali may be one or more of the hydroxides which have been referred to above. The temperature at which the reaction may take place may vary from 200° to 250° C. with a preferred range of 210° to 220° C. The pressure may be from 20 to 35 atmospheres, it having been found that particularly satisfactory results are obtained when carrying out the process under a pressure of from 25 to 30 atmospheres. The concentration of the carbohydrate material may be from 20 to 45 per cent. It is more desirable to operate at higher concentrations, and a concentration of about 40 per cent has given a satisfactory product in good yield.

The practice of the invention herein described permits of the production of lactic acid by chemical means from carbohydrate material in a relatively short period of time, 1.5 to 2.5 hours, under conditions readily attained in commercial practice and a yield of about 80 per cent on the weight of the carbohydrate material entering the reaction may be obtained. The lactic acid produced forms salts, such as sodium lactate, calcium lactate etc., which are very soluble in water and is well adapted for many industrial uses, such as the removal of lime from hides in the production of leather.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A process for the production of lactic acid which comprises reacting a carbohydrate material with a strong alkali at a temperature of at least 200° C. and at a pressure of at least 20 atmospheres.

2. A process for the production of lactic acid which comprises reacting a carbohydrate material with a strong alkali at a temperature of 200° C. to 250° C. and at a pressure of at least 20 atmospheres.

3. A process for the production of lactic acid which comprises reacting a carbohydrate material with a strong alkali at a temperature of 200° C. to 250° C. and at a pressure of 20 to 35 atmospheres.

4. A process for the production of lactic acid which comprises reacting a carbohydrate material with a strong alkali at a temperature of at least 200° C., at a pressure of at least 20 atmospheres, and with continuous stirring.

5. A process for the production of lactic acid which comprises reacting a carbohydrate material with a strong alkali at a temperature of at least 200° C. and at a pressure of at least 20 atmospheres, continuously stirring the reaction mass, and recovering the lactic acid so produced.

6. A process for the production of lactic acid which comprises reacting a carbohydrate material with calcium hydroxide at a temperature of at least 200° C. and at a pressure of at least 20 atmospheres, continuously stirring the reaction mass and recovering the lactic acid so produced by removing insoluble material, and separating calcium lactate by crystallization.

7. A process for the production of lactic acid which comprises reacting a carbohydrate material with calcium hydroxide at a temperature of at least 200° C., at a pressure of at least 20 atmospheres, continuously stirring the reaction mass and recovering lactic acid so produced by removing insoluble material by filtration and separating calcium lactate by slow crystallization at room temperature, and with stirring.

8. A process for the production of lactic acid which comprises reacting a carbohydrate material with calcium hydroxide at a temperature of at least 200° C., at a pressure of at least 20 atmospheres, continuously stirring the reaction mass and recovering lactic acid so produced by removing insoluble material from the reaction mass and then adding sulphuric acid to the liquor thus obtained in an amount sufficient to convert the calcium lactate into lactic acid.

9. A process for the production of lactic acid which comprises reacting a carbohydrate material with calcium hydroxide at a temperature of at least 200° C., at a pressure of at least 20 atmospheres, continuously stirring the reaction mass, recovering lactic acid so produced by removing insoluble material from the reaction mass by filtration, adding sulphuric acid of about 50 per cent strength to the liquor thus obtained in an amount sufficient to convert the calcium lactate into lactic acid, and separating lactic acid thus produced from precipitated calcium sulphate.

10. A process for the production of lactic acid which comprises reacting a carbohydrate material with calcium hydroxide at a temperature of at least 200° C., at a pressure of at least 20 atmospheres, continuously stirring the reaction mass, recovering lactic acid so produced by adding zinc sulphate to the hot solution containing calcium lactate, removing calcium sulphate thus formed while hot, and then cooling and crystallizing zinc lactate from the containing liquor.

11. A process for the production of lactic acid which comprises reacting a carbohydrate material with calcium hydroxide at a temperature of at least 200° C. and at a pressure of at least 20 atmospheres, continuously stirring the reaction mass, recovering lactic acid so produced by adding zinc sulphate in hot concentrated aqueous solution to a hot solution of calcium lactate, removing calcium sulphate thus formed while hot by filtration, and then cooling and crystallizing zinc lactate from the filtrate.

12. In a process for the production of lactic acid by treating a carbohydrate material with calcium hydroxide, the steps which comprise adding zinc sulphate to a hot solution containing calcium lactate, removing calcium sulphate thus formed while hot, and separating zinc lactate by cooling and crystallization.

13. In a process for the production of lactic acid by treating a carbohydrate material with calcium hydroxide, the steps which comprise adding a hot concentrated aqueous solution of zinc sulphate to a hot solution containing calcium lactate in an amount sufficient to precipitate the calcium as calcium sulphate, removing said calcium sulphate from the hot solution by filtration, and separating zinc lactate in crystalline form from the filtrate by cooling.

14. A process for the production of lactic acid which comprises reacting a carbohydrate material with calcium hydroxide at a temperature of at least 200° C. and at a pressure of at least 20 atmospheres.

15. A process for the production of lactic acid which comprises reacting a carbohydrate material with calcium hydroxide at a temperature of at least 200° C. and at a pressure of at least 20 atmospheres with continuous stirring.

16. A process for the production of lactic acid which comprises reacting a carbohydrate material with calcium hydroxide at a temperature of 200° to 250° C., at a pressure of from about 20 to 35 atmospheres, and with continuous stirring.

17. A process for the production of lactic acid which comprises reacting cane sugar with calcium hydroxide at a temperature of at least 200° C., at a pressure of at least 20 atmospheres with continuous stirring, and then recovering lactic acid so produced.

18. A process for the production of lactic acid which comprises reacting cane sugar with calcium hydroxide at a temperature of 210° to 220° C., at a pressure of 20 to 35 atmospheres with continuous stirring, and then recovering lactic acid so produced.

19. A process for the production of lactic acid which comprises reacting about 1 mole of cane sugar with about 2 moles of calcium hydroxide at a temperature of 210° to 220° C., at a pressure of 20 to 35 atmospheres with continuous stirring, and recovering lactic acid so produced.

20. A process for the production of lactic acid which comprises reacting about 1 mole of cane sugar with about 2 moles of calcium hydroxide at a temperature of 210° to 220° C., at a pressure of 20 to 35 atmospheres with continuous stirring, recovering lactic acid so produced by removing insoluble material by filtration, adding a hot concentrated aqueous solution of zinc sulphate to the liquor containing calcium lactate, whereby calcium sulphate is precipitated, removing said calcium sulphate by filtration, and separating zinc lactate through crystallization.

GEZA BRAUN.